(12) United States Patent
Buschbeck et al.

(10) Patent No.: US 12,194,540 B2
(45) Date of Patent: Jan. 14, 2025

(54) METHOD FOR PRODUCING A MATERIAL LAYER

(71) Applicant: Siemens Aktiengesellschaft, Munich (DE)

(72) Inventors: Jörg Buschbeck, Nuremberg (DE); Gotthard Rieger, Munich (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/923,850

(22) PCT Filed: Mar. 12, 2021

(86) PCT No.: PCT/EP2021/056301
§ 371 (c)(1),
(2) Date: Nov. 7, 2022

(87) PCT Pub. No.: WO2021/223926
PCT Pub. Date: Nov. 11, 2021

(65) Prior Publication Data
US 2023/0182205 A1    Jun. 15, 2023

(30) Foreign Application Priority Data
May 8, 2020  (EP) .................................. 20173706

(51) Int. Cl.
*B22F 3/10*   (2006.01)
*B22F 3/105*  (2006.01)
(Continued)

(52) U.S. Cl.
CPC ............ *B22F 5/006* (2013.01); *B22F 3/1007* (2013.01); *B22F 3/1021* (2013.01); *B22F 3/105* (2013.01);
(Continued)

(58) Field of Classification Search
CPC ...... B22F 5/006; B22F 3/1007; B22F 3/1021; B22F 3/105; B22F 2003/1054;
(Continued)

(56) References Cited

U.S. PATENT DOCUMENTS 6,183,689 B1     2/2001  Roy et al.
2016/0354841 A1*  12/2016  Vieyra Villegas ......... B01J 2/16
(Continued)

FOREIGN PATENT DOCUMENTS

CN    101255546 A    9/2008
CN    108328910 A    7/2018
(Continued)

OTHER PUBLICATIONS

Tang, Jie et al; "Production and Application of Environmentally-Friendly Ceramics"; China Building Materials Press; published: Jan. 31, 2018; pp. 117-118.
(Continued)

*Primary Examiner* — Rebecca Janssen
(74) *Attorney, Agent, or Firm* — Henry M. Feiereisen LLC (57) ABSTRACT

In a method for producing a material sheet, in particular a metallic material sheet, a green body containing solid-state particles is sintered at a sintering temperature by heating the green body during sintering at least partly using microwave energy in accordance with a defined temperature profile having a heating phase and an essentially isothermal hold phase. A temperature of the green body is ascertained contactlessly with a sensor, and a supply of heat energy is controlled as a function of the temperature of the green body. During the heating phase an average microwave power is supplied and during the hold phase another average microwave power is supplied which is less than the one average microwave power.

11 Claims, 7 Drawing Sheets

(51) Int. Cl.
  *B22F 5/00* (2006.01)
  *B32B 15/01* (2006.01)
  *H02K 15/02* (2006.01)
(52) U.S. Cl.
  CPC ..... *B32B 15/011* (2013.01); *B22F 2003/1054* (2013.01); *B22F 2201/20* (2013.01); *B22F 2203/03* (2013.01); *B22F 2203/11* (2013.01); *B22F 2998/10* (2013.01); *H02K 15/02* (2013.01)
(58) Field of Classification Search
  CPC .............. B22F 2201/20; B22F 2203/03; B22F 2203/11; B22F 2998/10; B22F 3/003; B32B 15/011; H02K 15/02; Y02P 10/25
  See application file for complete search history.

(56) References Cited

U.S. PATENT DOCUMENTS

| | | | |
|---|---|---|---|
| 2017/0239892 A1* | 8/2017 | Buller | ................ B28B 17/0081 |
| 2018/0262078 A1 | 9/2018 | Huter | |
| 2021/0320571 A1 | 10/2021 | Seufert et al. | |
| 2021/0323240 A1* | 10/2021 | Champion | ............. B33Y 30/00 |

FOREIGN PATENT DOCUMENTS

| | | | | |
|---|---|---|---|---|
| CN | 108637263 A | 10/2018 | | |
| DE | 196 40 898 A1 | 4/1998 | | |
| EP | 1 719 566 A2 | 11/2006 | | |
| EP | 3 373 421 A1 | 9/2018 | | |
| EP | 3 595 148 41 | 1/2020 | | |
| TW | 200422124 A | 11/2004 | | |
| WO | WO 2004/073037 A2 | 8/2004 | | |
| WO | WO-2014044432 A1 * | 3/2014 | ................ B22F 3/20 | |

OTHER PUBLICATIONS

PCT International Search Report and Written Opinion of International Searching Authority mailed Jun. 14, 2021 corresponding to PCT International Application No. PCT/EP2021/056301 filed Mar. 12, 2021.

* cited by examiner

METHOD FOR PRODUCING A MATERIAL LAYER

CROSS-REFERENCES TO RELATED APPLICATIONS

This application is the U.S. National Stage of International Application No. PCT/EP2021/056301, filed Mar. 12, 2021, which designated the United States and has been published as International Publication No. WO 2021/223926 A1 and which claims the priority of European Patent Application, Ser. No. 20/173,706.1, filed May 8, 2020, pursuant to 35 U.S.C. 119 (a)-(d).

BACKGROUND OF THE INVENTION

The invention relates to a process for producing a material sheet, especially a metallic material sheet.

The invention also relates to a material sheet for a laminated stack of an electrical rotating machine, produced by such a process.

The invention further relates to an electrical machine having a laminated stack having a multitude of material sheets.

The invention moreover relates to a closed-loop control device having means of performing such a process.

The Invention additionally relates to a computer program product for performing such a process, executed in a closed-loop control device.

In electrical machines, especially in motors and generators, laminated stacks composed of stacked electrical steel sheets are used in order to suppress the spread of eddy currents. Such electrical steel sheets, which comprise, for example, a soft magnetic material, especially iron, are typically cut or punched out of rolled large sheets. Subsequent, the sheets are combined to form a laminated stack. Such a production process is referred to hereinafter as a conventional production process, although it is currently not possible by rolling to produce sheets having a sheet thickness of less than 100 μm on an industrial scale. Moreover, waste arises when the sheets are cut or punched out of the large sheets.

Laid-open specification EP 3 595 148 A1 describes a process for producing a material sheet having a sheet thickness between 0.5 and 500 μm, comprising the steps of: applying a suspension including at least one binder and solid-state particles by means of a template to a base surface in order to obtain a green body, driving the binder out of the green body, especially by means of debindering, establishing sustained coherence of the solid-state particles by heating and/or by means of consolidation, especially by means of sintering.

Published specification WO 2014/044432 A1 describes a process for producing a refractory metal component, wherein the process includes the following steps: providing an extrusion mass including a refractory metal powder composed of at least one refractory metal and/or a compound thereof and at least one binder; and excluding the extrusion mass to give at least one green body; wherein the step of extruding the extrusion mass is followed by a step of heat treatment of the at least one green body.

Published specification EP 1 719 566 A2 describes a process for producing a metallic component, comprising: providing a mixture of a metallic powder and a binder, melting the mixture and shaping the mixture to give a preform in the shape of the component, removing a majority of the binder from the preform and heating the preform with microwave energy in order to remove the remainder of the binder and to sinter the metal powder together in order to form the component.

Patent specification U.S. Pat. No. 6,183,689 B1 describes a process for sintering green powder components made of metal, metal alloys or metal compositions using microwave energy.

Published specification EP 3 373 421 A1 describes a housing unit for an electrical machine, especially for a PM servo motor, having a first bearing shield, having an intermediate flange and having a first laminated stator core. A thin stainless steel housing of the electrical machine can be achieved in an inexpensive and simple manner in that the first bearing shield, the laminated stator core and the intermediate flange have a shared stainless steel coating produced by means of an additive manufacturing method, wherein the housing unit is formed from the first bearing shield, the laminated stator core, the intermediate flange and the shared stainless steel coating.

Published specification WO 2004/073037 A2 describes a combination of microwave and convection/radiation heating, which is used in a system and a process for binder removal and for sintering of materials such as ceramic materials and products, LTCC intervals, solid oxide fuel cells and powder metals.

During a conventional sintering process, thermal energy is supplied from the outside by introduction by means of infrared radiation and/or heat of convection. This mode of heating requires long heating times with high energy demand since a system composed of open space, component and auxiliary structures heats up only slowly as a result of delays owing to conduction of heat and heat capacity. Especially in the free sintering of thin, especially metallic, material sheets having, for example, a sheet thickness of 0.1 μm to 1 mm with a high aspect ratio, for support of the green bodies that are still mechanically unstable during the sintering process, auxiliary structures are required, the volume and therefore also thermal inertia of which lead to temperature gradients across the material sheets.

In material sheets containing iron or an iron-base alloy, such temperature gradients lead to formation of an incompletely consolidated or inhomogeneous microstructure, which is functionally unfavorable since the magnetic properties, especially the coercive field, strongly depend on the size and arrangement of the grain structure and the internal interfaces thereof and additionally on enrichment of impurities. In order to achieve sufficient density and homogeneity of the microstructure, especially on account of the lack of preconsolidation as a result of a screen printing process, very long hold times are required in the conventional sintering process. At the same time, the additional energy required for heating of auxiliary structures is so significant that the sintering of thin, especially metallic, material sheets by means of the conventional sintering process described is uneconomic for reasons of time and cost.

Published specification EP 1 721 699 A1 describes a process for producing a metallic component, comprising the providing of a body produced from a first alloy, the providing of a preformed comprising a metal powder produced from a second alloy and shaped in the form of an extension of the body, and the heating of the preform with microwave energy in order to sinter the metal powder together and to bond the preform to the body.

It is an object of the invention to specify a process for producing a material sheet, especially a metallic material sheet, which is faster and less costly compared to the prior art.

SUMMARY OF THE INVENTION

The object is achieved in accordance with the invention by a process for producing a material sheet, especially a metallic material sheet, wherein a green body comprising solid-state particles is provided, wherein the green body is sintered at at least one sintering temperature and wherein the green body in the sintering operation is heated at least partly by means of microwave energy, wherein the green body is heated according to a defined temperature profile, wherein supply of heat energy is controlled by a temperature of the green body, wherein the temperature of the green body is ascertained contactlessly by means of at least one sensor, wherein the temperature profile for the sintering has at least a heating phase and at least an essentially isothermal hold phase, wherein a third average microwave power is supplied during the heating phase, wherein a fourth average microwave power is supplied during the hold phase and wherein the fourth average microwave power is lower than the third average microwave power.

The object is also achieved in accordance with the invention by a material sheet for a laminated stack of electrical rotating machine produced by such a process, wherein the material sheet has been produced from a metallic material and has a density of at least 85%, especially at least 90%, of the corresponding metallurgically produced metallic material.

Moreover, the object is achieved in accordance with the invention by an electrical machine having a laminated stack having a multitude of material sheets.

In addition, the object is achieved in accordance with the invention by a computer program product for performing such a process, executed in a closed-loop control device.

The advantages and preferred configurations cited below in relation to the process can be applied mutatis mutandis to the material sheet, electrical machine and the closed-loop control device.

The invention is based on the consideration of accelerating the sintering operation of material sheets that are usable, for example, in laminated stacks of electrical machines, by supplying microwave energy in order to achieve a higher throughput. Such a material sheet, in the ready-sintered state, has an aspect ratio, i.e. a ratio of maximum length to sheet thickness, of at least 50:1, especially of 100:1. For example, the material sheet has a sheet thickness in the range from 0.1 μm to 1 mm, especially from 0.5 μm to 500 μm. The material sheet includes solid-state particles, especially metallic solid-state particles, containing iron, nickel, cobalt and/or alloys thereof, for example, and producible by pressing or screenprinting, for example. The solid-state particles take the form, for example, of alloy powders or of mixtures of powders of pure elements.

The microwave energy is especially supplied by a microwave source, in the form, for example, of a magnetron. The microwave energy generates electromagnetic vibrations within a frequency range, for example, of 300 MHz to 300 GHz. In particular, electromagnetic vibrations are generated with frequencies within an ISM band (industrial, scientific and medical application band), for example at 915 MHZ +/−13 MHZ, 2.45 GHZ +/−50 MHz or 5.8 GHZ +/−75 MHz. Optionally, additional energy is supplied by a further heat source, for example via heating elements.

The supply of microwave energy leads to an accelerated consolidation process. Especially at the start of the sintering operation, in which the green body is in a relatively porous state and has high electrical resistance, there is maximum introduction of microwave energy, which means that a relatively short heating time and fast initial consolidation is achieved. The relatively short heating time, even with process gases of relatively low purity, leads to a low level of oxidation and hence to little contamination in the sintered material, which leads, for example, to improved mechanical properties and offers cost benefits.

Moreover, on account of selective heating by the microwaves, support structures and/or retaining structures for the green body, produced from quartz glass, for example, are essentially microwave-transparent and do not contribute to energy consumption. Furthermore, the microwave energy, on account of uniform consolidation in terms of volume, achieves fewer pores and a more homogeneous grain size compared to a purely conventional sintering process, which is reflected in improved microstructural, geometric and mechanical properties of the sintered material. In the case of a material sheet composed of a metallic material, for example iron ore and iron alloy, a density of at least 85%, especially at least 90%, of the corresponding metallurgically produced metallic material is achieved. Moreover, by virtue of the material selectivity, improved formation of interfaces is achievable.

The closed-loop control device especially controls the at least one sintering temperature. The means possessed by the closed-loop control device for performance of the sintering operation include, for example, an open-loop control device, a setpoint device and a memory. In particular, the closed-loop control device has a digital logic unit configured for the production process. The digital logic unit takes the form, for example, of a microprocessor, microcontroller, FPGA (field programmable gate array) or ASIC (application-specific integrated circuit). The computer program product of the invention is configured at least for closed-loop control of the sintering temperature. In addition, the computer program product may comprise a digital twin that models at least one temperature characteristic of the sintered material, especially in the case of supply of microwave energy. Such a digital twin is described, for example, in published specification US 2017/0286572 A1. The disclosure content of US 2017/0286572 A1 is incorporated into the present application by reference.

The green body is heated according to a defined temperature profile, wherein supply of heat energy is controlled by a temperature of the green body. Heating using a temperature profile achieves a reproducible quality of the material sheets. In particular, through the introduction of the microwaves into the green body, local measurement of the green body temperature is more accurate than, for example, a measurement of the ambient temperature.

The temperature of the green body is ascertained contactlessly by means of at least one sensor. The sensor takes the form, for example, of an infrared temperature sensor. Such a contactless sensor enables very accurate detection of the green body temperature. Furthermore, no additional metallic components are required, such as feeds and/or metallic thermal resistors, which influence the magnetic field during the microwave heating. In particular, by mechanical or optical variation of the measurement field, a temperature distribution over a green body is detectable. In addition, temperatures of various green bodies are detectable by means of such a contactless sensor during the heating operation.

The temperature profile for the sintering has at least one heating phase and at least one essentially isothermal hold phase, wherein a third average microwave power is supplied during the heating phase, wherein a fourth average microwave power is supplied during the hold phase and wherein the fourth average microwave power is lower than the third average microwave power. The high third microwave power during the heating phase heats up the green body quickly and cost-efficiently to the sintering temperature, forming sinter necks between the particles, which leads to distinctly better conduction of heat. Especially after the attainment of the sintering temperature, the microwave power is reduced, with the conventional heat source assuming the task of coarsening the microstructure of the already preconsolidated green body. During the essentially isothermal hold phase, the sintering temperature is controllable rapidly and efficiently by microwave power.

In a further embodiment, the green body that additionally comprises a binder is debindered at at least one debindering temperature and, in a subsequent step, sintered at at least one sintering temperature, wherein the sintering temperature is higher than the debindering temperature, wherein the green body in the debindering operation and in the sintering operation is heated at least partly by means of microwave energy. In particular, the solid-state particles together with a binder form a suspension for production of the green body. For example, an organic binder is used, of such a nature that it associates completely or virtually completely into gaseous constituents on heating. The debindering temperature is, for example, 600 to 800° C., while the sintering temperature is, for example, 1200 to 1500° C. In particular, the sintering takes place immediately after the debindering in order to save time. As well as the short heating time during the sintering and debindering, supply of microwave energy reduces oxidation and hence contamination of the green body, which leads to better magnetic properties, for example in the case of metal sheets. In addition, process gases having lower purity are usable, resulting in a cost saving.

In a further embodiment, the green body is debindered and/or sintered by means of hybrid heating. Hybrid heating, as well as microwave heating, additionally comprises conventional heating, which takes place, for example, via induction heating, resistance heating or gas heating. In particular, the green body, at the start, if heated primarily with microwaves, which leads to formation of sinter necks between the particles and hence to distinctly better conduction of heat, and then a conventional heat source that has been switched on assumes the function of coarsening the microstructure of the already preconsolidated green body. Hybrid heating accelerates the debindering and sintering process. Since microwaves are introduced only poorly at room temperature in the case of some materials, a shorter heating phase is achievable by hybrid heating.

In a further embodiment, the green body is at least partly debindered in a reducing atmosphere. The reducing atmosphere contains, for example, a hydrogen-nitrogen mixture or a hydrogen-noble gas mixture, especially a hydrogen-argon mixture. The nitrogen or noble gas functions as purge gas. In particular, the debindering process takes place in a reducing atmosphere at a low pressure of less than 100 mbar. The reducing atmosphere prevents oxidation and hence impurities. Particularly organic binders are driven out essentially without residue by removing the carbon atoms from the green body.

In a further embodiment, the green body is at least partly sintered in a vacuum. The vacuum enables rapid heating.

In a further embodiment, the temperature profile for the debindering has at least a heating phase and at least an essentially isothermal hold phase, wherein a first average microwave power is supplied during the heating phase, wherein a second average microwave power is supplied during the hold phase and wherein the second average microwave power is less than the first average microwave power. The higher first microwave powder brings the green body rapidly to the debindering temperature in a controlled manner without occurrence of damage, for example in the form of cracks. During the essentially isothermal hold phase, the debindering temperature is controllable rapidly and efficiently by microwave power.

In a further embodiment, in the sintering operation, at least one hold phase is followed by a cooling phase, wherein a temperature during the cooling phase is controlled by supply of microwave power. Microwave-based temperature control during the cooling phase prevents damage, for example by precipitation, to the material sheet.

In a further embodiment, the material sheet is produced from iron and has a density of at least 6600 kg/m$^3$. A material sheet produced from iron is understood to mean that the material sheet is produced from iron and/or an iron alloy, especially an iron-base alloy. Iron-based alloys are, for example, iron-cobalt and iron-silicon. By the use of microwave heating, such a high density is achievable in the sintering operation.

In a further embodiment, the material sheet has a sheet thickness between 0.5 μm and 500 μm. In the case of such a thickness, for example, sufficient suppression of eddy currents is achieved in the case of use in an electrical rotating machine.

BRIEF DESCRIPTION OF THE DRAWING

The invention is described and elucidated in detail hereinafter by the working examples shown in the figures.

The figures show.

The working examples elucidated hereinafter are preferred embodiments of the invention. In the working examples, the described components of the embodiments each constitute individual features of the invention that should be considered independently, each of which also independently develop the invention and should thus also be regarded as part of the invention individually or in any combination other than that disclosed. Furthermore, the embodiments described can also be supplemented by further features of the invention that have already been described.

DETAILED DESCRIPTION OF PREFERRED EMBODIMENTS

Identical reference numerals have the same meaning in the different figures.

Figure 1:
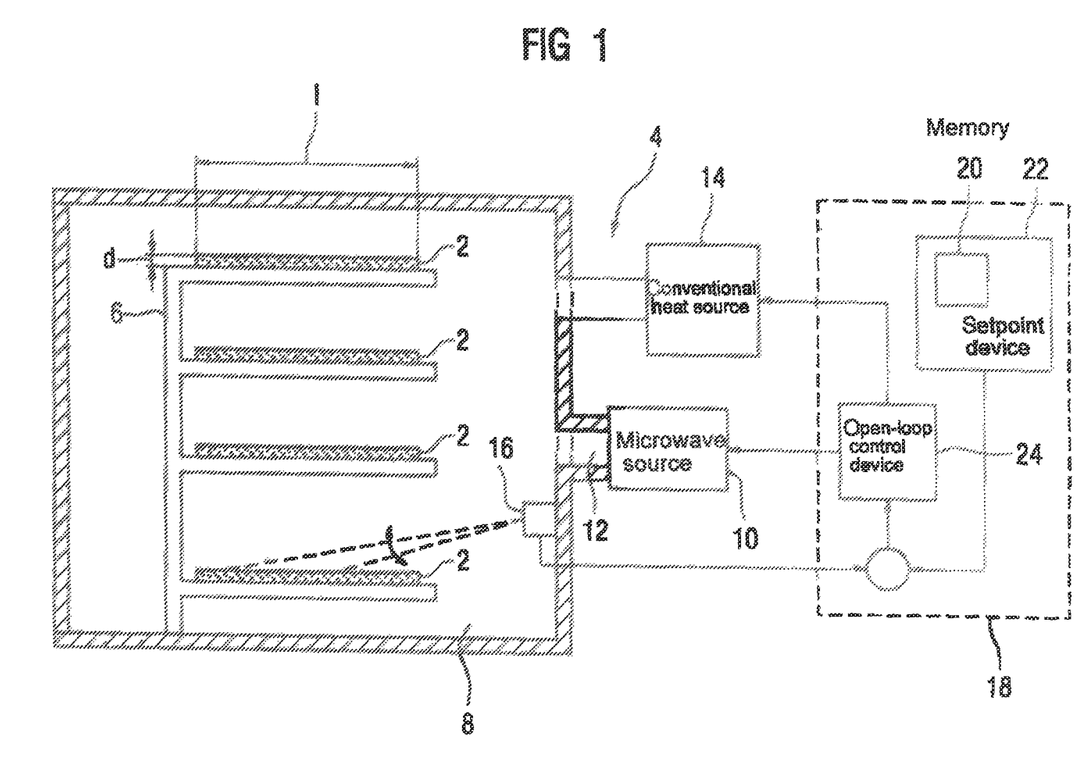
FIG. 1 a schematic diagram of a production process for material sheets with a hybrid oven, FIG. 2 an enlarged detail of a green body prior to debindering, FIG. 3 a schematic diagram of a first configuration of a temperature profile for the debindering and sintering of a green body by means of hybrid heating, FIG. 4 a schematic diagram of a second configuration of a temperature profile for the debindering and sintering of a green body by means of hybrid heating, FIG. 5 a schematic diagram of a production process for material sheets with a microwave oven, FIG. 6 a schematic diagram of a temperature profile for the sintering of a green body by means of microwave heating, and FIG. 7 a schematic diagram of a production process for material sheets with a hybrid oven having multiple hollow conductors.

FIG. 1 shows a schematic diagram of a production process for material sheets 2 having a hybrid oven 4, wherein the ready-sintered material sheets 2 each have an aspect ratio, i.e. a ratio of maximum length l to sheet thickness d, of at least 50:1, especially of 100:1. For example, the ready-sintered sheet thickness d is between 0.1 µm and 1 mm, especially between 0.5 µm and 500 µm. In the hybrid oven 4, the material sheets 2 in the form of green bodies are debindered, and sintered immediately thereafter. The hybrid oven 4 is configured for debindering and sintering by means of hybrid heating. As well as microwave heating, hybrid heating additionally comprises conventional heating, for example via induction heating, resistance heating or gas heating. For example, the green bodies, prior to debindering and sintering, are produced by means of screenprinting from a suspension comprising at least one binder, especially an organic binder, and solid-state particles, and positioned on a carrier 6, the carrier 6 having been produced from a dielectric material, especially a ceramic such as aluminum oxide. The characteristics of the binder are such that it dissociates completely or virtually completely into gaseous constituents on heating. In particular, the material sheets 2 take the form of electrical steel sheets for an electrical machine, for example a motor or a generator, within the solid-state particles for an electrical steel sheet contain a soft magnetic material, for example iron, nickel, cobalt and/or alloys thereof.

Figure 7:
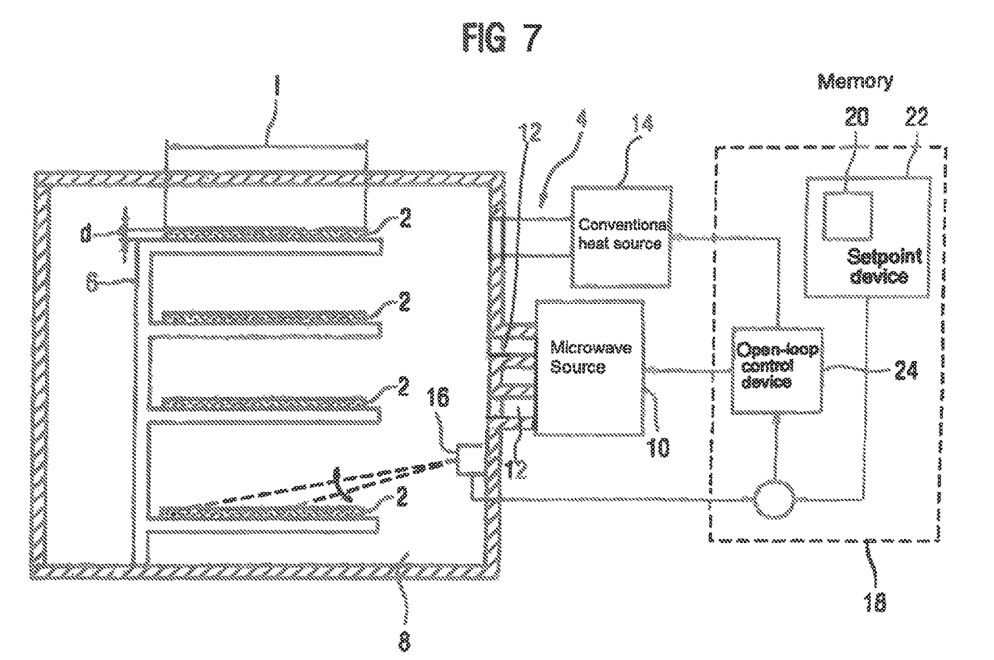

The green bodies are disposed on the carrier 6 in a chamber 8 of the hybrid oven 4, wherein the chamber 8 takes the form of a resonator for a microwave source 10. The microwave source 10 especially takes the form of a magnetron and is connected by way of example to the chamber 8 via a hollow conductor 12. The microwave source 10 generates electromagnetic vibrations with a frequency range, for example, of 300 MHz to 300 GHz. In particular, electromagnetic vibrations are generated with frequencies within an ISM band (industrial, scientific and medical application band), for example at 915 MHz +/−13 MHZ, 2.45 GHZ +/−50 MHZ or 5.8 GHz +/−75 MHz. A maximum power of the microwave source 10 is chosen depending on the material, shape and number of the green bodies, and the size of the chamber 8. The microwave power can optionally be supplied via multiple hollow conductors 12 at different positions in order to achieve more homogeneous heating of the green bodies, as can be seen in FIG. 7.

Furthermore, the hybrid oven 4 comprises a conventional heat source 14, which takes the form, for example, of an induction heat source, of a resistance heating source or of a gas-heated source. During the debindering and sintering, a temperature of at least one green body is monitored by means of a sensor 16, especially a contactless sensor 16. The sensor 16 takes the form, for example, of an infrared temperature sensor. Microwave source 10 and the conventional heat source 14 are actuated by a closed-loop control device 18 that controls the temperature of the at least one green body during the debindering and sintering with reference to a temperature profile. The temperature profile is recorded in a memory 20, for example in the form of a lookup table, in a setpoint device 22 and is compared with the temperature of the at least one green body for closed-loop control. The ascertained variance of the actual value from the target value is processed further in an open-loop control device 24 for actuation, especially separate actuation, of the microwave source 10 and the conventional heat source 14 for closed-loop control of the temperature. Optionally, the temperature ascertained by the sensor 16 is used together with a digital twin of the hybrid oven 4 for closed-loop temperature control. In addition, the closed-loop control device 18 controls a pressure and a gas composition in the chamber 8. The closed-loop control device 18 has a digital logic unit configured for the production process. The digital logic unit takes the form, for example, of a microprocessor, microcontroller, FPGA (field programmable gate array) or ASIC (application-specific integrated circuit).

Figure 2:
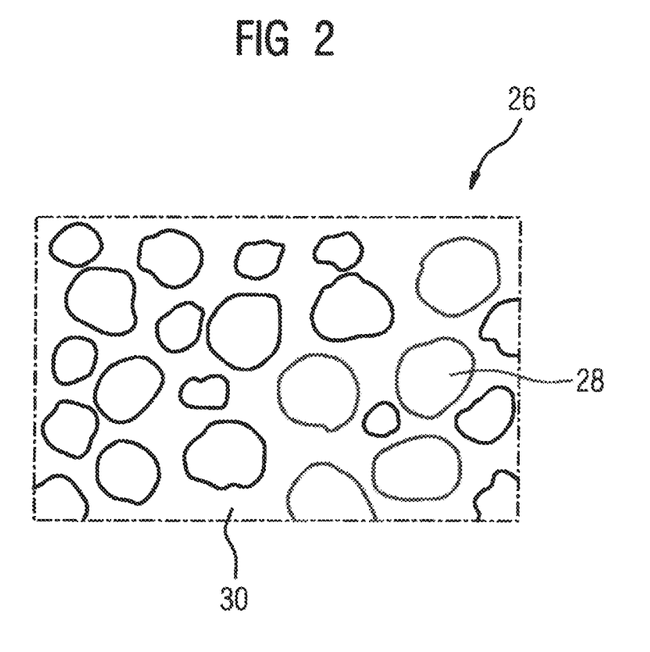

FIG. 2 shows an enlarged detail of a green body 26 prior to debindering E, containing a suspension of solid-state particles 28 and a binder 30, especially an organic binder 30. The solid-state particles are in powder form and comprise particles of electrically and/or magnetically conductive material, especially metal particles. For example, the solid-state particles contain iron, nickel, cobalt and/or alloys thereof. The further configuration of the green body 26 in FIG. 2 corresponds to that in FIG. 1.

Figure 3:
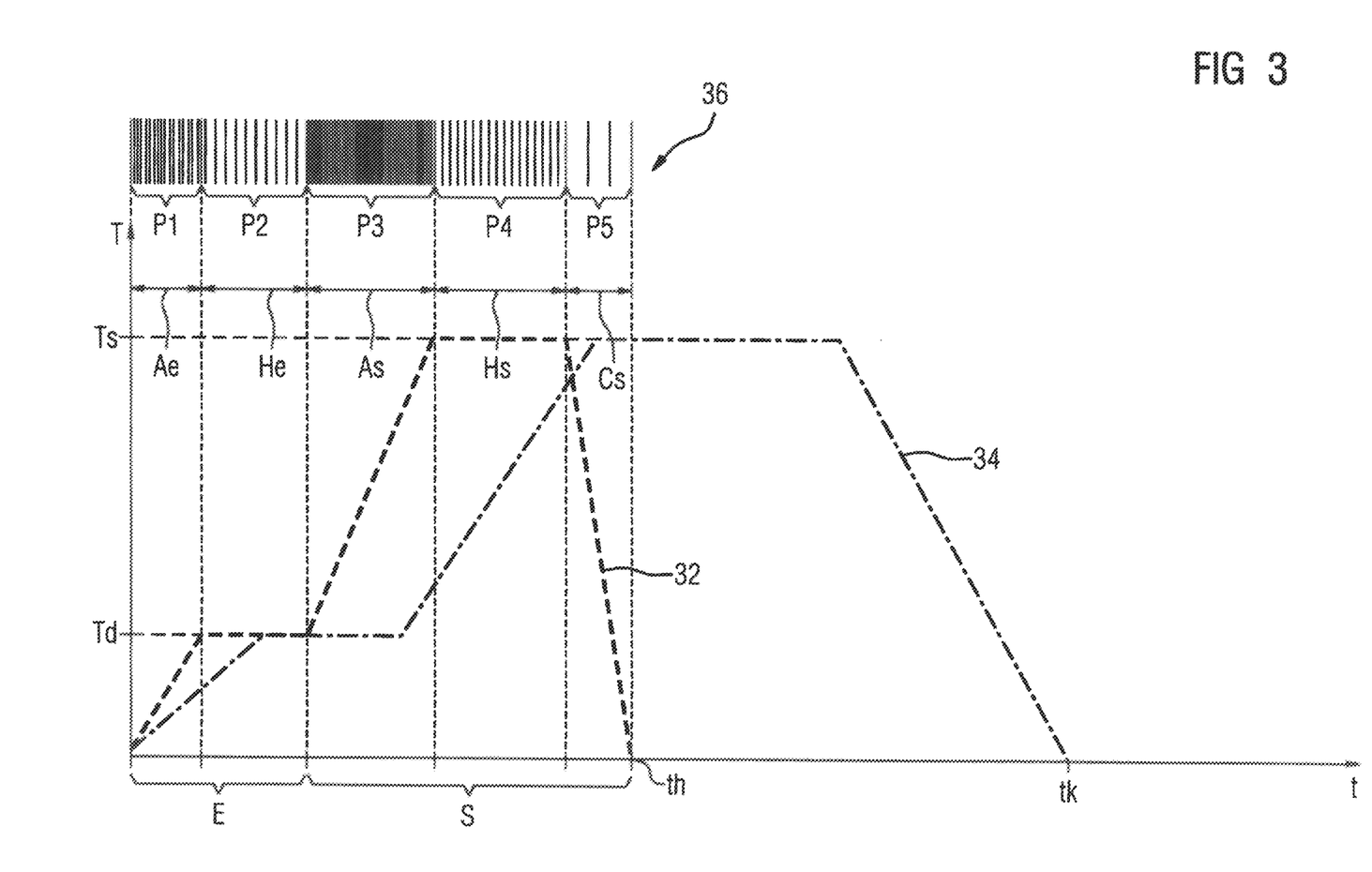

FIG. 3 shows a schematic diagram of a first configuration of a temperature profile 32 for the debindering E and sintering S of at least one green body by means of hybrid heating, showing a temperature profile 34 for the debindering E and sintering S by means of conventional heating by way of comparison. The temperature T is plotted qualitatively against time t. The total period tk of the temperature profile 34 for the conventional heating is, for example, 10 hours. The total period th of the temperature profile 32 for the hybrid heating is, for example, 33% shorter. The details that follow relate to the temperature profile 32 for the debindering E and sintering S by means of hybrid heating.

In addition, FIG. 3 shows an operation scheme 36 of the microwave source 10 for the debindering E and sintering S by means of hybrid heating as a function of time t in relation to the temperature profile 32, showing pulsed operation of the microwave source 10 with the aid of vertical dashes. The microwave source 10 takes the form, for example, of a magnetron, with closed-loop control of a power released by means of a duty cycle. The duty cycle or phase control factor is calculated from the ratio of pulse duration to period duration. Vertical dashes having a very small gap represent a high duty cycle, corresponding to a high average power at constant peak output. Continuous wave operation is also referred to as CW operation for short. The conventional heat source is operated parallel to the microwave source 10 during the debindering and sintering operation.

The at least one green body is heated up first to a debindering temperature Td and then to a sintering temperature Ts both in the case of hybrid heating and in the case of conventional heating. In the case of debindering E by means of hybrid heating, a heating phase Ae, for example in linear form, is followed by an essentially isothermal hold phase He. During the heating phase Ae, a first average microwave power P1 is supplied, wherein a second average microwave power P2 is supplied during the hold phase He and the second average microwave power P2 is less than the first average microwave power P1. During the debindering E, the binder, especially the organic binder, is driven out in a reducing atmosphere, so as to remove carbon atoms from the green body. Reducing atmosphere contains, for example, a hydrogen-nitrogen mixture or a hydrogen-noble gas mixture, especially a hydrogen-argon mixture, at a low pressure of less than 100 mbar. The nitrogen or the noble gas functions as purge gas. The debindering temperature Td here is, for example, 600 to 800° C.

The hold phase He of the debindering E is followed immediately by a heating phase As, for example in linear form, for the sintering S up to a sintering temperature Ts of, for example, 1200 to 1500° C. The heating phase As up to the sintering temperature Ts takes place at a low pressure, for example 20 mbar, with a reducing atmosphere being advisable in order that no carbonization takes place and any possible residual carbon is removed. The subsequent, essentially isothermal, hold phase Hs takes place in a vacuum. In the sintering operation S, during the heating phase As, a third average microwave power P3 is supplied, wherein a fourth average microwave power P4 is supplied during the hold phase Hs and the fourth average microwave power P4 is lower than the third average microwave power P3. Especially in the course of sintering S during the heating phase As, a maximum power of the microwave source 10 is supplied in order to shorten the heating phase. The hold phase Hs is followed by a cooling phase Cs, wherein the temperature during the cooling phase Cs is controlled by supply, especially variable supply, of microwave power P5, wherein the conventional heat source 14 is switched off during the cooling phase Cs.

The at least one material sheet 2 produced from a metallic material that has been sintered from the at least one green body, after the sintering S, has a density of at least 90% of the corresponding metallurgically produced material. For example, the at least one material sheet 2 has been produced from iron, i.e. from iron or and iron-base alloy, for example iron-cobalt or iron-silicon, and after the sintering S has a density of at least 6600 kg/m$^3$.

Figure 4:
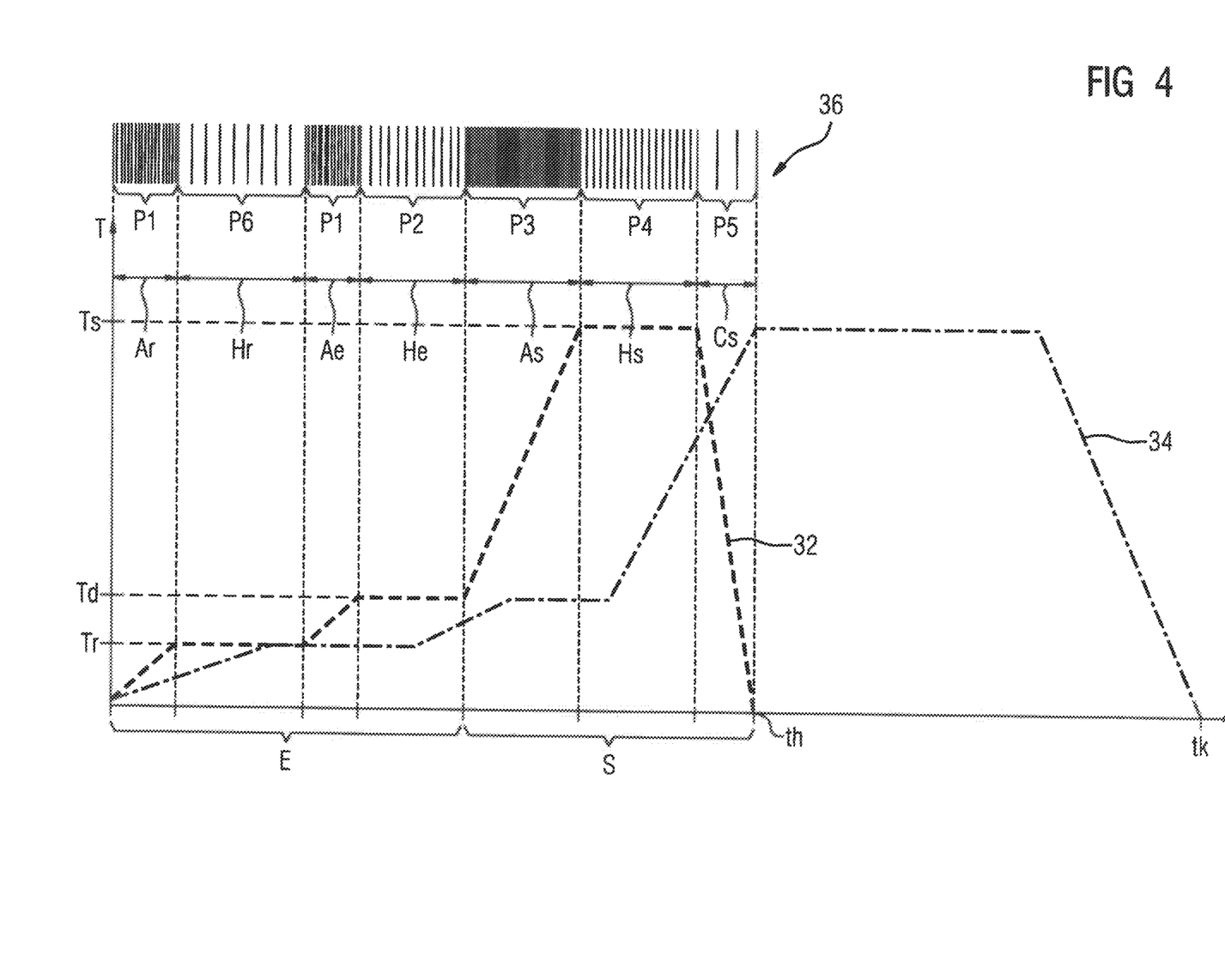

FIG. 4 shows a schematic diagram of a second configuration of a temperature profile 32 for the debindering E and sintering S of at least one green body by means of hybrid heating, showing a temperature profile 34 for the debindering E and sintering S by means of conventional heating by way of comparison. During the debindering E, the green body is first heated in a vacuum in a cleaning heating phase Ar to a cleaning temperature Tr at the first average microwave power P1, with a cleaning temperature Tr of, for example, 100 to 300° C. During a cleaning hold phase Hr, solvents are evaporated, and a surface cleaning operation is conducted, before being followed by the heating phase Ae for the actual debindering E. The further configuration of the temperature profile 32 in FIG. 4 corresponds to that in FIG. 3.

Figure 5:
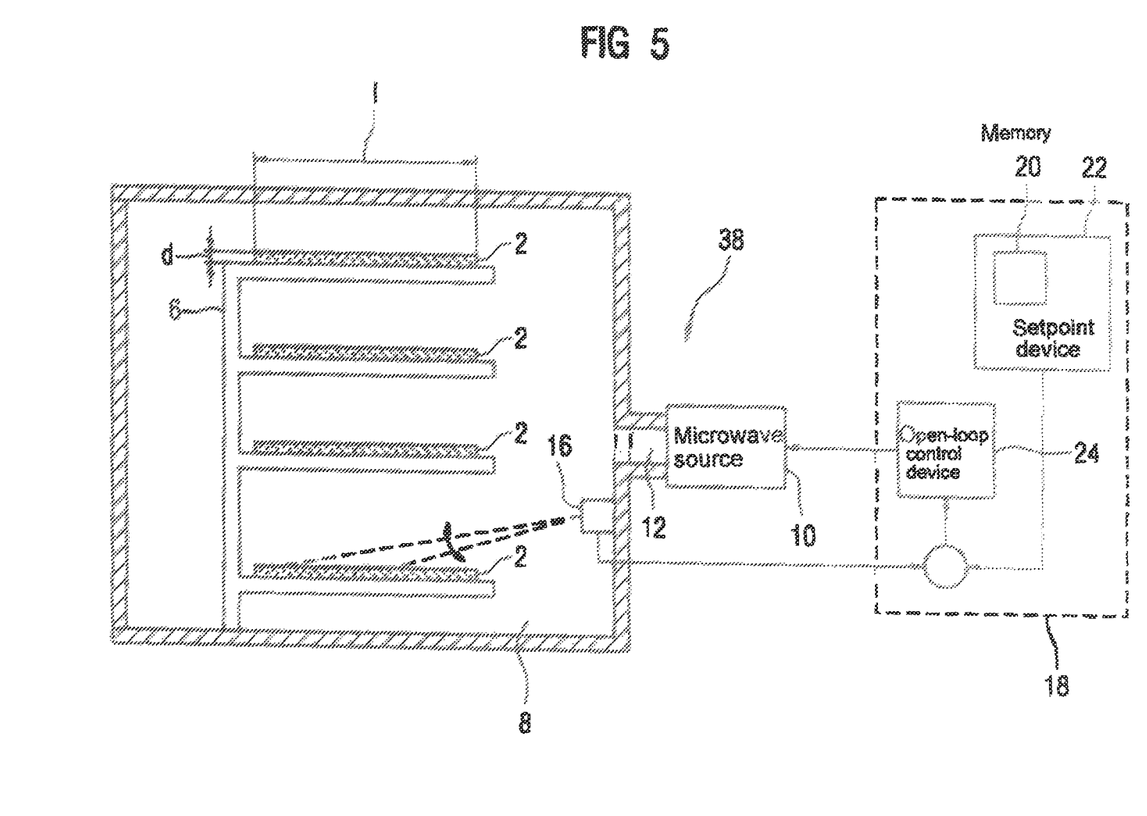

FIG. 5 shows a schematic diagram of a production process for material sheets 2 with a microwave oven 38. The sintering operation is effected by means of microwave heating, which is provided by a microwave source 10 via a Hollow conductor 12. The further execution of the production process in FIG. 5 corresponds to that in FIG. 1.

Figure 6:
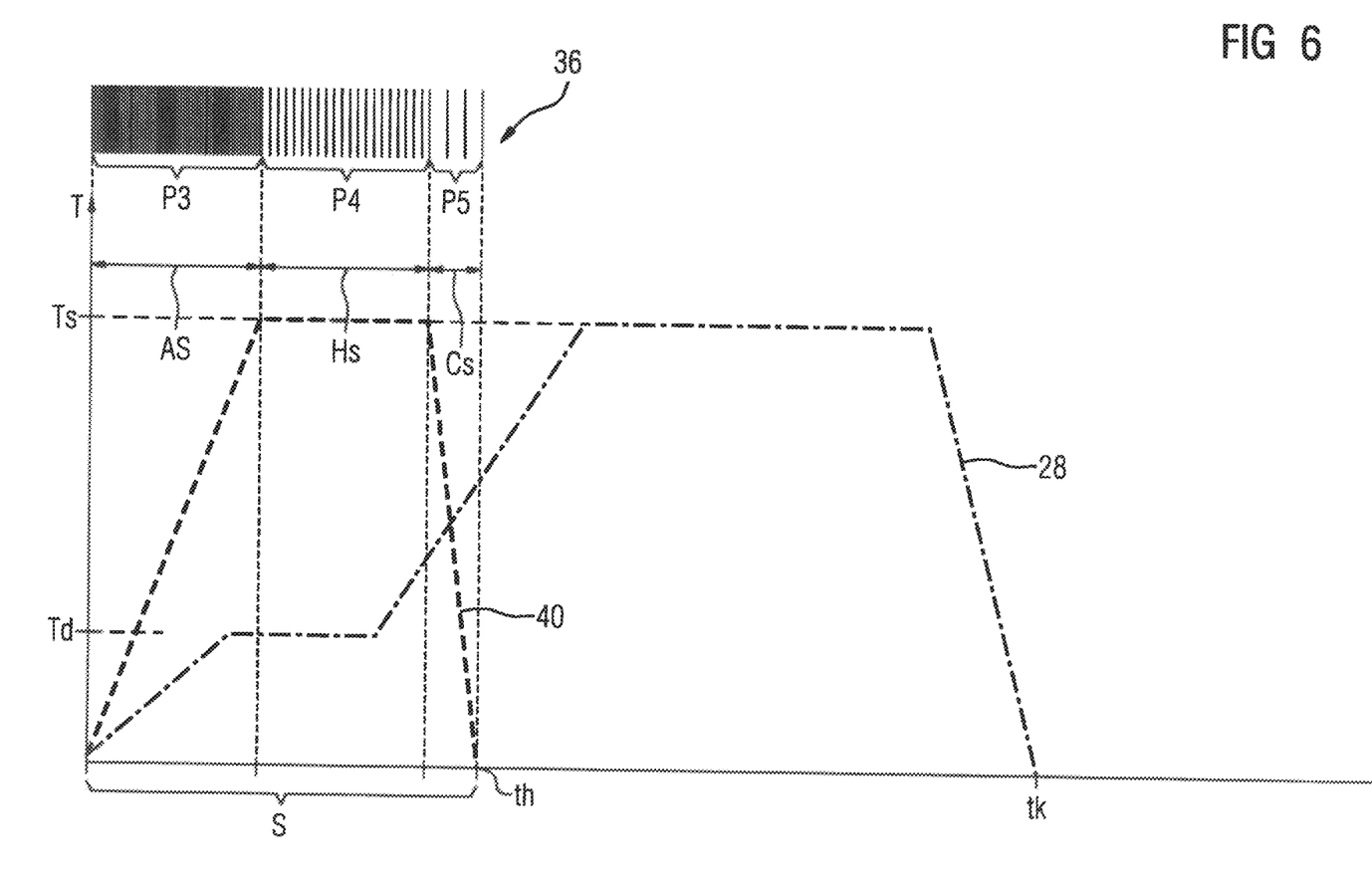

FIG. 6 shows a schematic diagram of a temperature profile 40 for the sintering S of a green body by means of microwave heating, using a microwave oven 38 according to FIG. 5. The green body to be sintered here either does not include any binder, in which case a green body without binder comprises pressed solid-state particles, for example, or the green body includes solid-state particles with a readily volatile binder which is driven out directly, especially cracked, on sintering S in the heating phase As. Readily volatile binders are especially aromatic or aliphatic oils, for example mineral oil derivatives. The heating phase As is followed by a hold phase Hs, wherein the fourth average microwave power P4 supplied is lower than the fifth average microwave power P5 during the heating phase As. The hold phase Hs is followed by a cooling phase Cs, wherein the temperature during the cooling phase Cs is controlled by supply, especially variable supply, of microwave power P5. The further configuration of the temperature profile 40 in FIG. 6 corresponds to that in FIG. 3.

In summary, the invention relates to a process for producing a material sheet 2, especially a metallic material sheet 2. In order to achieve a higher speed of the production process and better cost position compared to the prior art, it is proposed that a green body 26 be provided, comprising solid-state particles 28, wherein the green body 26 is sintered at at least one sintering temperature Ts and wherein the green body 26 in the sintering operation S is heated at least partly by means of microwave energy.

The invention claimed is:

1. A method for producing a material sheet, said method comprising:
    disposing a green body on a support in a chamber of a hybrid oven designed as a resonator for a microwave source;
    sintering the green body containing solid-state particles at a sintering temperature by heating the green body during sintering at least partly using microwave energy in accordance with a defined temperature profile having a heating phase and an essentially isothermal hold phase;
    ascertaining contactlessly with a sensor a temperature of the green body;
    controlling a supply of heat energy as a function of the temperature of the green body; and
    supplying during the heating phase an average microwave power and during the hold phase another average microwave power which is less than the average microwave power.

2. The method of claim 1, further comprising:
    debindering a binder contained in the green body at a debindering temperature before the green body is sintered at the sintering temperature, with the sintering temperature being higher than the debindering temperature; and
    heating the green body during debindering at least partly by using microwave energy in accordance with a defined temperature profile.

3. The method of claim 2, wherein the green body is debindered and/or sintered by hybrid heating.

4. The method of claim 2, wherein the green body is at least partly debindered in a reducing atmosphere.

5. The method of claim 1, wherein the green body is sintered at least partly in a vacuum.

6. The method of claim 2, wherein the temperature profile for the debindering comprises a heating phase in which an average microwave power is supplied, and an essentially isothermal hold phase in which another average microwave power is supplied which is less than the average microwave power.

7. The method of claim 1, wherein the temperature profile includes a cooling phase which follows the hold phase, and further comprising controlling a temperature during the cooling phase through supply of microwave power.

8. The method of claim 2, further comprising producing the green body, prior to the debindering and sintering, by screenprinting a suspension comprising the binder and the solid-state particles.

9. The method of claim 8, wherein the binder is an organic binder.

10. The method of claim 1, further comprising supplying the microwave energy to the chamber through multiple hollow conductors at different positions.

11. A computer program product for producing a material sheet, comprising a computer program embodied in a non-transitory computer readable medium, wherein the computer program, when loaded into a closed-loop control device and executed by a closed-loop control device, causes the closed-loop control device to perform a method as set forth in claim 1.

* * * * *